United States Patent [19]

Okawa et al.

[11] 4,276,589
[45] Jun. 30, 1981

[54] TWELVE-STEP CURRENT SOURCE INVERTER

[75] Inventors: Tadashi Okawa; Mitsuyuki Honbu; Yasuo Matsuda; Takanori Shibata; Toshio Kawaguchi, all of Hitachi, Japan

[73] Assignee: Hitachi, Ltd., Tokyo, Japan

[21] Appl. No.: 27,098

[22] Filed: Apr. 4, 1979

[30] Foreign Application Priority Data

Apr. 5, 1978 [JP] Japan .................................. 53-39219

[51] Int. Cl.³ ............................................ H02M 1/12
[52] U.S. Cl. ........................................ 363/71; 363/43; 363/58; 363/137
[58] Field of Search ............................. 363/43, 57–58, 363/71, 96, 135, 136, 137, 138

[56] References Cited

U.S. PATENT DOCUMENTS

| 3,573,602 | 4/1971 | Jensen .................................. 363/43 |
| 3,781,635 | 12/1973 | Sauer .................................. 363/43 X |
| 3,838,330 | 9/1974 | Rosa .................................. 363/137 X |
| 3,838,331 | 9/1974 | Jensen .................................. 363/43 |
| 3,876,923 | 4/1975 | Humphrey et al. ............. 363/137 X |
| 4,063,143 | 12/1977 | Forstbauer .................... 363/43 X |

Primary Examiner—William M. Shoop
Assistant Examiner—Peter S. Wong
Attorney, Agent, or Firm—Craig & Antonelli

[57] ABSTRACT

At least one smoothing reactor is connected to the positive terminal of a DC source. A first interphase reactor has its one end connected to the other end of the smoothing reactor. A second interphase reactor is connected to the negative terminal of the DC source. Each of the first and second interphase reactors has first and second terminals at the other end thereof. Connected between the first terminals of the first and second interphase reactors is a first inverter comprising three main valves on each side of the positive and negative terminals, i.e., a total of six main valves each having a control gate and forming a first three-phase bridge. Also connected between the second terminals of the first and second interphase reactors is a second inverter comprising three main valves arranged on each side of the positive and negative terminals, i.e., a total of six main valves each having a control gate and forming a second three-phase bridge. The three-phase output terminals of the first and second inverters are respectively connected in common to a load to supply first-phase, second-phase and third-phase output currents to the load. A control unit applies control gate pulses to the control gates of the positive-terminal-side and negative-terminal-side main valves of the first and second inverters in the order of the first, second and third phases to shape the waveform of each output current to the load into a rectangular waveform. The control unit controls the first and second inverters in such a manner that the current valves of two currents which flow to the main valves of the first and second inverters having the same phase and polarity includes ranges in which the currents periodically assume the same current value.

6 Claims, 10 Drawing Figures

TWELVE-STEP CURRENT SOURCE INVERTER

BACKGROUND OF THE INVENTION

The present invention relates to current-fed twelve-step current wave inverters or twelve-step current source inverters.

A current source inverter of a multiple-step type is known in the art in which, as shown in FIG. 1, inverters INV1 and INV2 are connected in parallel with a common DC source 11 through DC reactors 12 to 15 which smooth the DC current supplied from the DC source 11. The first inverter INV1 forms a first three-phase bridge with positive-terminal-side first main valves UP1, VP1 and WP1 with control gate and negative-terminal-side second main valves UN1, VN1 and WN1 with control gate. The second inverter INV2 forms a second three-phase bridge with positive-terminal-side first main valves UP2, VP2 and WP2 with control gate and negative-terminal-side second main valves UN2, VN2 and WN2 with control gate. Although not shown, each of the first and second inverters includes first and second commutating devices for quenching the first and second main valves. Usually, the main valves are each comprised of a thyristor, and numeral 16 designates for example an AC motor which receives the resultant output currents of the inverters INV1 and INV2. To increase the capacity of the twelve-step current source inverter and also to improve its output waveform, the DC input voltages applied to the first and second inverters INV1 and INV2 must be made equal to each other. A control unit 410 applies to the control gates of the main valves those pulses which determine the firing order and firing intervals of the main valves in the first and second inverters INV1 and INV2.

It is well known in the art that the desired reduction of the lower order harmonics in the resultant output currents of a twelve-step current source inverter can be achieved by the phase-shifted addition of two inverter output currents resulting in a twelve-step load line current.

Known systems of the above type are shown, as for example, in Japanese Patent Application No. 15863/76, which was published before examination as Laying-open No. 52-100124, entitled "Control System for Multiple-Step Current Source Inverters".

The resultant output currents of this type of twelve-step current source inverter have the waveforms as shown in FIG. 2. In FIG. 2(a), $I_{p1}$ represents the direct current flowing to the positive-side main valves of the first inverter INV1. $I_{P2}$ indicates the direct current flowing to the positive-side main valves of the second inverter INV2. $I_{N1}$ indicates the direct current flowing to the negative-side main valves of the first inverter INV1. $I_{N2}$ indicates the direct current flowing to any one of the negative-side main valves of the second inverter INV2.

Shown in FIG. 2(b) is a U-phase output current IU. Shown in FIG. 2(c) is a timing of control gate pulses applied to the control gates of the positive-side first main valves UP1, VP1 and WP1 of the first inverter INV1. Shown in FIG. 2(d) is a timing of control gate pulses applied to the control gates of the positive-side first main valves UP2, VP2 and WP2 of the second inverter INV2. Shown in FIG. 2(e) is a timing of control gate pulses applied to the control gates of the negative-side second main valves UN1, VN1 and WN1 of the first inverter INV1. Shown in FIG. 2(f) is a timing of control gate pulses applied to the negative-side second main valves UN2, VN2 and WN2 of the second inverter INV2. These gate pulses are produced by the control unit 410 with respective pulse widths of predetermined time intervals and applied sequentially to the control gates of the positive-side first main valves and the negative-side second main valves of the first and second inverters INV1 and INV2 in the order of the 1st phase (U phase), 2nd phase (V phase) and 3rd phase (W phase). In this case, as shown in FIG. 2, the waveforms of the direct currents $I_{P1}$ and $I_{P2}$ and that of the output current IU are distorted as compared with that of an ideal rectangular wave for the following reasons. In other words, as will be seen from FIGS. 2(c) and 2(d), the main valves UP1 and WP2 are turned on during the time interval between times $t_0$ and $t_1$ and consequently the AC line voltage between the lines U and W of the motor 16 is applied to the series connection of the DC reactors 12 and 13. This causes the currents flowing to the DC reactors 12 and 13 to change. Thus, in the case of the current $I_{P1}$ flowing to the main valve UP1, for example, it varies as shown by the i-to-j portion in FIG. 2(a). During the next time period $t_1$ to $t_4$, the main valves UP1 and UP2 are turned on so that the terminal voltage of the motor 16 is not applied to the DC reactors 12 and 13 and the fixed current from the DC source 11 flows to zhe DC reactors 12 and 13. Thus, in the case of the current $I_{P1}$, for example, it varies as shown by the j-to-k portion in (a) of FIG. 2. During the next time period $t_4$ to $t_5$, the main valves UP1 and VP2 are turned on and consequently the AC line voltage between the lines U and V of the motor 16 is applied to the DC reactors 12 and 13. In this case, due to the following reasons, the polarity of the DC current flowing through a series circuit of the reactors 12 and 13 during the time period $t_4$ to $t_5$ is opposite to the polarity of such DC current flowing during the time period $t_0$ to $t_1$ and the current $I_{P1}$ varies as shown by the k-to-l portion in FIG. 2(a). Namely, since the main valve UP1 is fired prior to the main valve UP2 during the time period $t_0$ to $t_1$ as will be seen from FIGS. 2(c) and 2(d), the voltage applied to the DC reactors 12 and 13 is in a direction from the reactor 12 toward the reactor 13. On the contrary, during the time period $t_4$ to $t_5$ the main valve VP2 is fired before the main valve VP1 as will be seen from FIGS. 2(c) and 2(d) and consequently the voltage applied to the DC reactors 12 and 13 is in a direction from the latter toward the former. As a result, the current $I_{P1}$ flowing to the main valve UP1 varies during the period $t_0$ to $t_1$ in a direction opposite to the direction in variation of the same during the period $t_4$ to $t_5$. On the other hand, as shown in FIG. 2(a), the current $I_{P2}$ flowing to the main valve UP2 presents a waveform varying oppositely in direction to the current $I_{P1}$ due to the change of direction of the voltage applied to the DC reactors 12 and 13. The same operation is performed repeatedly and consequently the currents $I_{P1}$, $I_{P2}$, $I_{N1}$ and $I_{N2}$ flowing to the main valves result in pulsating waveforms as shown in FIG. 2(a). Consequently, the resulting output current waveform IU results in a waveform as shown in FIG. 2(b). In other words, since the main valve UP1 is fired prior to the main valve UP2 during the period $t_0$ to $t_1$, during this period, as shown at i' to j', the i-to-j component of the current flowing to the main valve UP1 appears as such in the IU phase as the U-phase output current IU. During the period $t_1$ to $t_4$ the currents $I_{P1}$ and $I_{P2}$ flowing to the main valves UP1 and UP2 during the period are superposed one upon another and result in the U-phase output current IU as shown by the j''-to-k'' portion. In the like manner, the U-phase output current IU appears as shown by the k'-to-l' portion during the period $t_4$ to $t_5$. Thus the waveform of the U-phase output current IU becomes as shown in FIG. 2(b).

In the twelve-step current source inverter shown in FIG. 1 the DC source 11 is provided in common to serve for the first and second inverters INV1 and INV2. As a result, the current flowing to the first and second inverters INV1 and INV2, respectively, cannot be controlled separately and the total value of the currents flowing from the DC source 11 to the first and second inverters INV1 and INV2 is controlled by for example a rectifier comprising a thyristor. When the twelve-step current source inverter is functioning normally, the average value of the current flowing to the first inverter INV1 becomes equal to that of the second inverter INV2. However, when any irregularity occurs, that is, when a commutation failure occurs in the first inverter INV1, the DC current flowing to the first inverter INV1 becomes unequal to that of the second inverter INV2. In such a case, it is necessary to detect rapidly the occurrence of an irregularity in the balance between the currents in the first and second inverters INV1 and INV2.

FIG. 3 shows an inverter of the above-described type which incorporates a fault detecting circuit for such purposes. In the Figure, numerals 17, 18, 19 and 20 designate current transformers disposed to respectively detect the DC current passed through DC reactors 12, 13, 14 and 15, respectively. The same reference numerals as used in FIG. 1 designate the identical or equivalent components. Since it is practically difficult to reduce the ripple factor of direct current to less than 30% for economical reasons, the resulting direct current detection signals must be smoothed by filters 21, 22, 24 and 25. The direct current detection signals passed through the filters 21, 22 and 24, 25, respectively, are applied to comparators 23 and 26 adapted to respectively detect that the difference between the currents $I_{P1}$ and $I_{P2}$ flowing to the main valves UP1 and UP2 as shown in FIG. 2(a) has exceeded a maximum deviation value z and a fault detection signal 27 or 28 is generated when the maximum deviation value z is exceeded. Numeral 500 designates combining means for combining the first and second inverters of currents to derive a three-phase system of resultant output currents.

The fault detecting circuit shown in FIG. 3 has a serious disadvantage that the use of the filters 21, 22, 24 and 25 causes a time delay in the detection of an abnormal current, thus tending to damage the main valves each comprising a thyristor or the like.

SUMMARY OF THE INVENTION

It is an object of the present invention to provide a twelve-step current source inverter which is capable of reducing low-order higher harmonics.

It is another object of the invention to provide a twelve-step current source inverter which is capable of quickly detecting the average value of the currents flowing to inverters and thereby capable of quickly taking a proper measure upon occurrence of any irregularity.

It is still another object of the invention to provide a twelve-step current source inverter which is capable of performing the desired fault detection with a simple arrangement.

It is still another object of the invention to provide a twelve-step current source inverter which is capable of producing an excellent output waveform.

In accordance with the invention there is thus provided a twelve-step current source inverter in which the control gate pulses applied from a control unit to the control gates of main valves in first and second three-phase bridge inverters are determined to cause the respective currents flowing to the main valves of the same phase and polarity in the first and second three-phase bridge inverters to become substantially the same during selected time intervals at the normal operating conditions. Also, the harmonics can be reduced by the addition of phase-shifted two inverter output currents.

As a means for this purpose, the present invention features one or the other of the arrangements stated in the following (1) and (2).

(1) The control unit is designed so that the positive-side and negative-side main valves of the first and second inverters are respectively fired in the order of the 1st phase, 2nd phase and 3rd phase and that the control gate pulses sequentially applied to the control gates are arranged as repetitions of a predetermined pulse train including a predetermined number of pulses whose pulse intervals constitute a specific permutation of three different time intervals.

(2) Noting the fact that where the same phase is being energized in each of two inverters, the direction of change of the direct current caused by the transfer of the conduction to another phase differs depending on either of the commutation in the first inverter and that in the second inverter is effected first, the gate pulses from the control unit are arranged in order so that there are time periods in which the direct currents flowing to the first and second inverters assume the same value.

DESCRIPTION OF THE PREFERRED EMBODIMENTS

Figure 2:
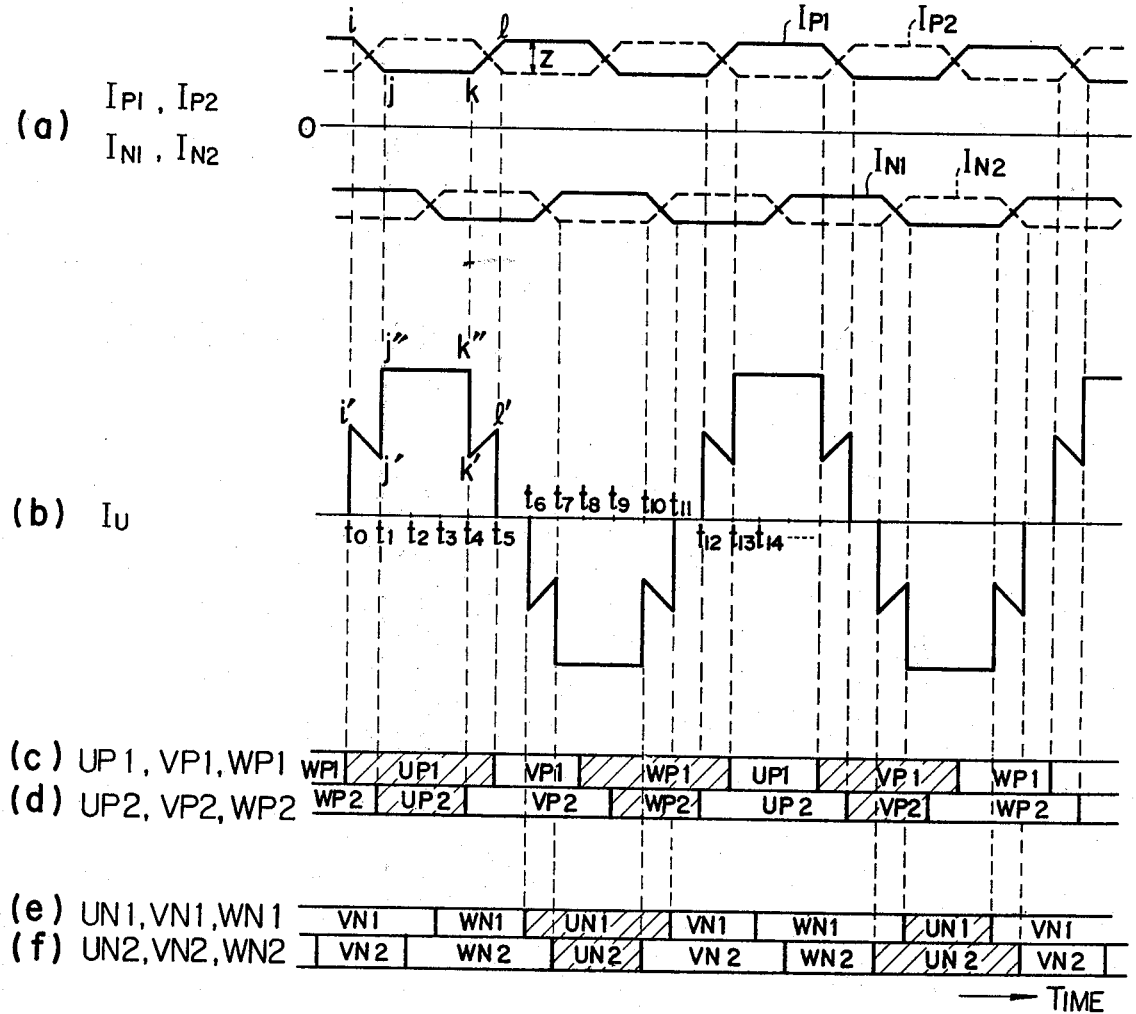
FIG. 2 is a diagram showing the gate pulse trains and waveforms illustrative of the operation of a prior art twelve-step current source inverter.
Figure 3:
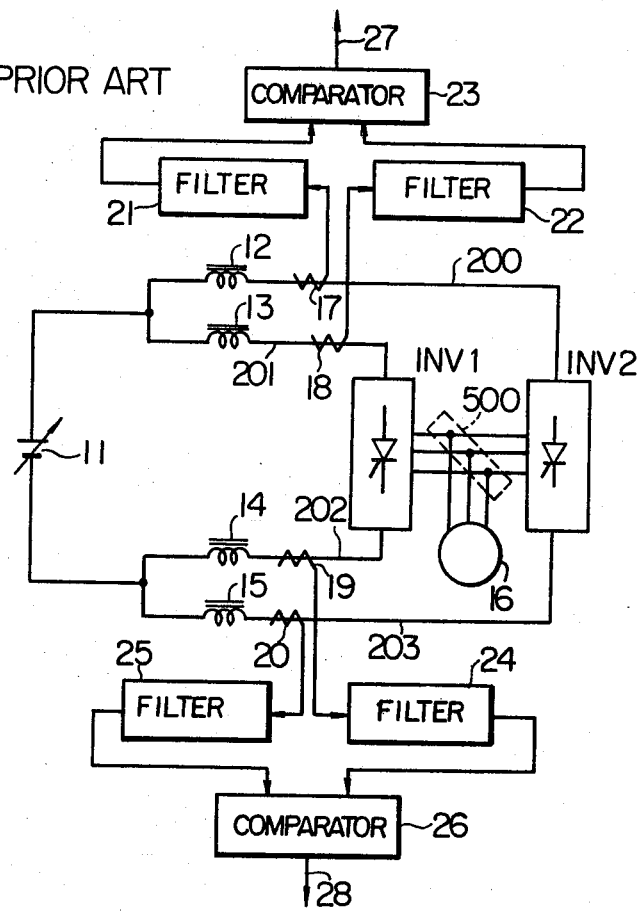
FIG. 3 is a circuit diagram of the fault detecting circuit used in a prior art twelve-step current source inverter of the type employing a gate pulse train.
Figure 4:
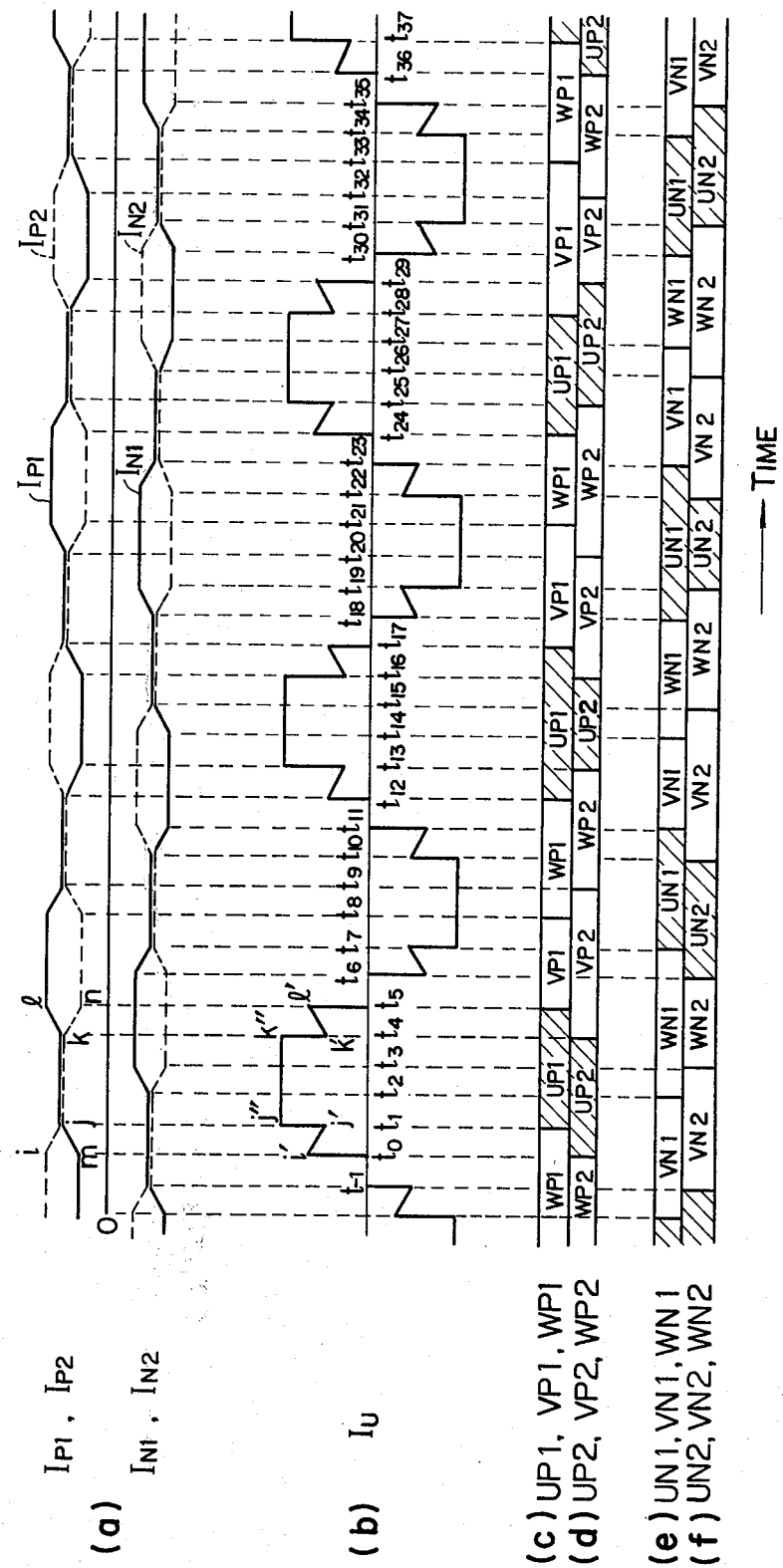
FIG. 4 is a diagram showing the gate pulse trains and waveforms illustrative of the operation of an embodiment of the invention.

Referring to FIG. 4, there are shown the gate pulse trains and waveforms illustrative of the operation of an embodiment of the invention. In the Figure, the waveforms in (a), (b), (c), (d), (e) and (f) are respectively illustrated in correspondence with (a), (b), (c), (d), (e) and (f) in FIG. 2.

In the Figure, where the commutation is transferred, for example, from W phase to U phase in each of first and second inverters INV1 and INV2, if the transfer of commutation to a main valve UP2 of the second inverter INV2 is effected prior to that of a main valve UP1 of the first inverter INV1 as during the time period $t_0$ to $t_1$, the resulting voltage applied to DC reactors 12 and 13 is opposite in polarity to that applied to the DC reactors 12 and 13 when the commutation of the main valve UP1 is effected prior to the main valve UP2 as during a time period $t_{12}$ to $t_{13}$. As a result, if one mode of operation for preferential commutation in the first inverter INV1 and another mode of operation for preferential commutation in the second inverter INV2 are selectively applied in a predetermined sequence during each of repeated cycle periods and if the number of operations of the former mode is equal to the number of operations of the latter mode during each one cycle period, it is possible to make the average value of the direct current flowing to the first and second inverters, respectively, equal to each other. In the case of FIG. 4, a time period $t_0$ to $t_{48}$ corresponds to one cycle period for the first main valves of the first and second inverters INV1 and INV2, respectively. In the time interval $t_0$ to $t_{13}$ the second inverter INV2 is commutated first during the periods $t_0$ to $t_1$ and $t_4$ to $t_5$ and the first inverter INV1 is commutated first during the periods $t_8$ to $t_9$ and $t_{12}$ to $t_{13}$. During the period $t_{13}$ to $t_{29}$, the second inverter INV2 is commutated first during the periods $t_{16}$ to $t_{17}$ and $t_{20}$ to $t_{21}$. If the control gate pulses of the pulse train are arranged correspondingly, assuming that A represents a pulse which effects commutation in the first inverter INV1 first and B represents one which effects commutation in the second inverter INV2 first, the pulse train comprises respective groups of pulses B, B, A and A, the groups being repeated at regular intervals. By so doing, as regards the main valves on the positive terminal side the direct currents $I_{P1}$ and $I_{P2}$ respectively flowing to the main valves of the first and second inverters INV1 and INV2 become equal to each other during the periods $t_1$ to $t_4$, $t_9$ to $t_{12}$, $t_{17}$ to $t_{20}$, $t_{25}$ to $t_{28}$ and $t_{33}$ to $t_{36}$. As regards the main valves on the negative terminal side, the direct currents $I_{N1}$ and $I_{N2}$ flowing to the main valves UN1 and UN2 of the first and second inverters INV1 and INV2 become equal to each other during the periods $t_{-1}$ to $t_2$, $t_7$ to $t_{10}$, $t_{15}$ to $t_{18}$, $t_{23}$ to $t_{26}$ and $t_{31}$ to $t_{34}$. Consequently, if these periods are selected as current detection periods, even if the output of the DC source contains any ripple component, the current waveform of the ripple component contained in the current $I_{P1}$ agrees with that of the ripple component contained in the current $I_{P2}$ and consequently the current components can be detected in a moment by fault current detecting means incorporating no filter. The detection of fault current can be accomplished by simply utilizing the fact that when the difference between the currents $I_{N1}$ and $I_{N2}$ exceeds a predetermined value in any one of the periods or intervals in which the currents $I_{N1}$ and $I_{N2}$ should be equal to each other, it is an indication that a fault has occurred.

The above-described embodiment of the invention is advantageous in that the detection of fault current can be accomplished without incorporating any filter in the detecting means for detecting the currents in the first and second inverters INV1 and INV2 and consequently the detection of direct currents can be effected with a high speed response to quickly take a measure in case of a fault.

Figure 5:
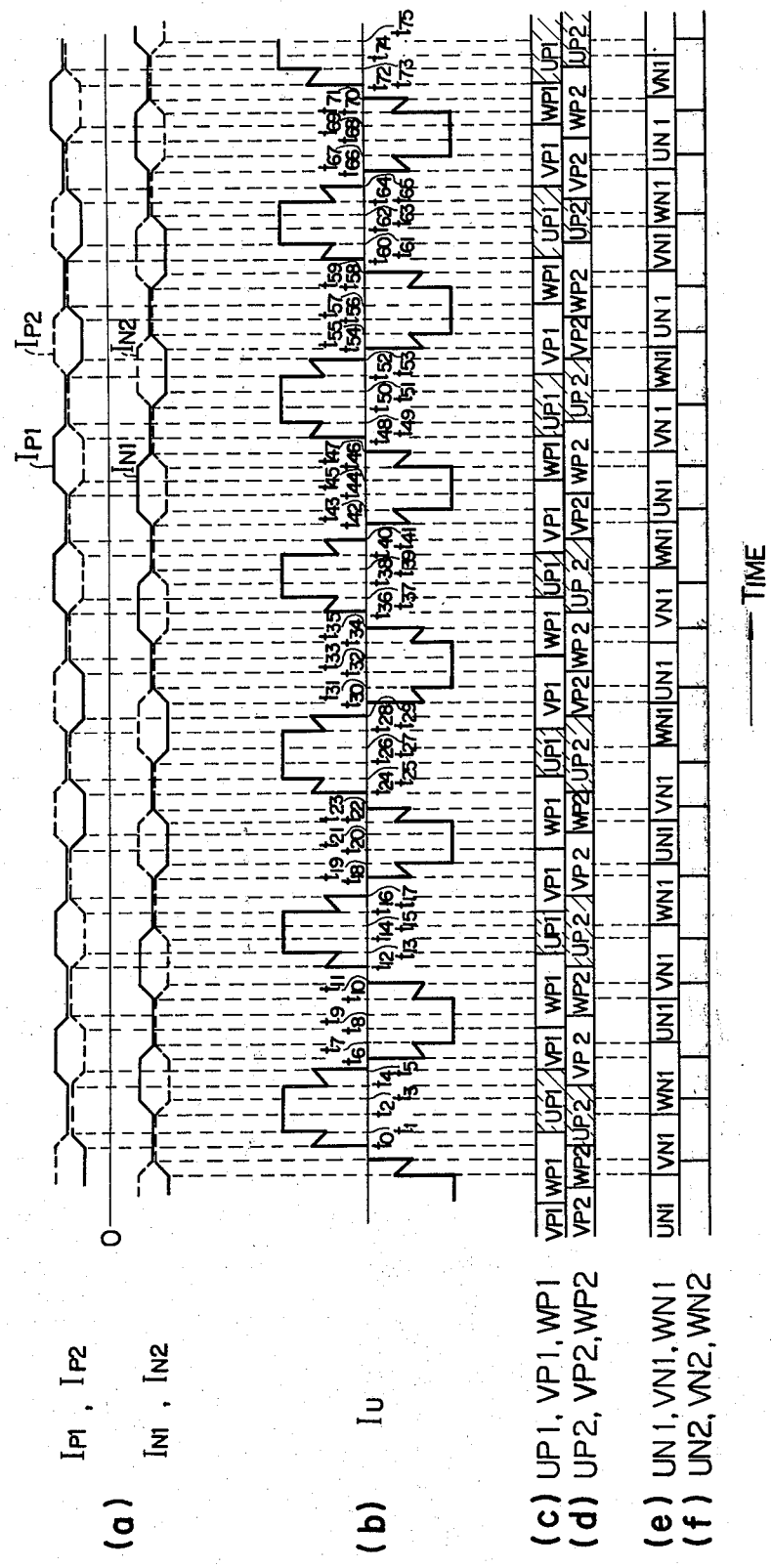
FIG. 5 is a diagram showing a gate pulse train and waveforms illustrative of the operation of another embodiment of the invention.

FIG. 5 shows the gate pulse trains and waveforms which are illustrative of the operation of another embodiment of the invention. In FIG. 5, the same reference numerals and symbols as used in FIG. 2 designate those which are identical with their counterparts shown in FIG. 2. In the Figure, assuming that symbol A designates a pulse for effecting commutation in the first inverter INV1 first and B designates a pulse for effecting commutation in the second inverter INV2 first, in the case of FIG. 5 the pulse train comprises respective groups of pulses A, B, B, A, B, A, A and B, the groups being repeated at regular intervals. By so doing, in the like manner as in the case of FIG. 4, periods will occur in which the instantaneous value of the direct current flowing to the first and second inverters INV1 and INV2, respectively, become equal to each other. These periods include intervals $t_1$ to $t_4$, $t_9$ to $t_{13}$, $t_{17}$ to $t_{20}$, etc., for the main valves on the positive terminal side. As a result, in the like manner as in the case of FIG. 4, by selecting these periods as the desired current detection periods for the first and second inverters INV1 and INV2, it is possible to rapidly effect the detection of direct current.

As will be seen from the foregoing description, the present invention is not limited to the cases of FIGS. 4 and 5 for providing periods in which the instantaneous value of the current flow through the first and second inverters INV1 and INV2, respectively, become equal to each other. This can be attained by simply devising a desired combination of preferential commutations of the first and second inverters INV1 and INV2 so as to ensure the equality between the average value of the direct current flow through the first and second inverters, respectively, and by selecting a pulse train designed to provide periods in which the instantaneous value of the direct current becomes equal to the average value.

Figure 6:
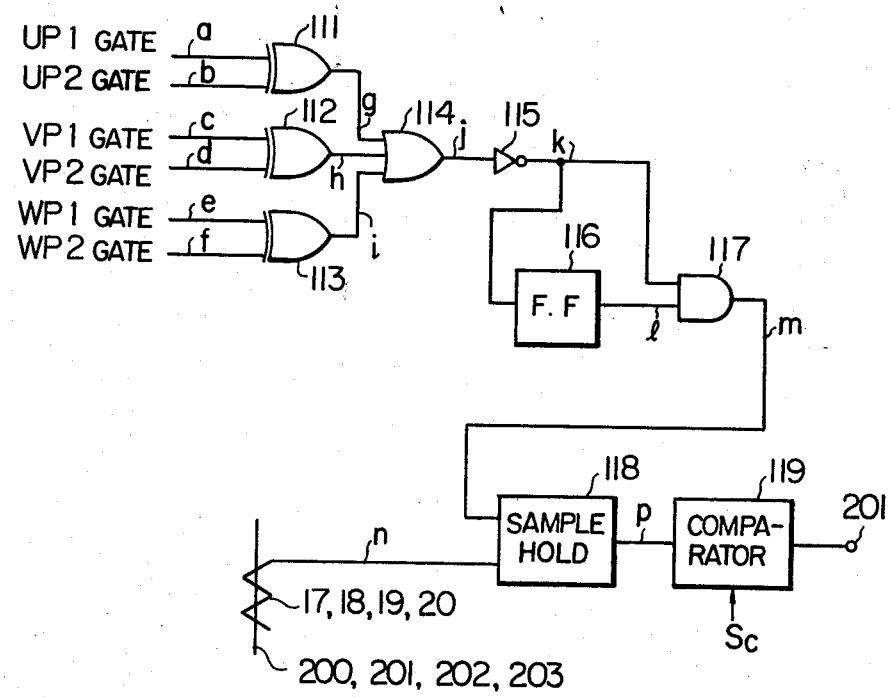
FIG. 6 is a block circuit diagram showing an embodiment of a fault detecting circuit used with the invention.
Figure 7:
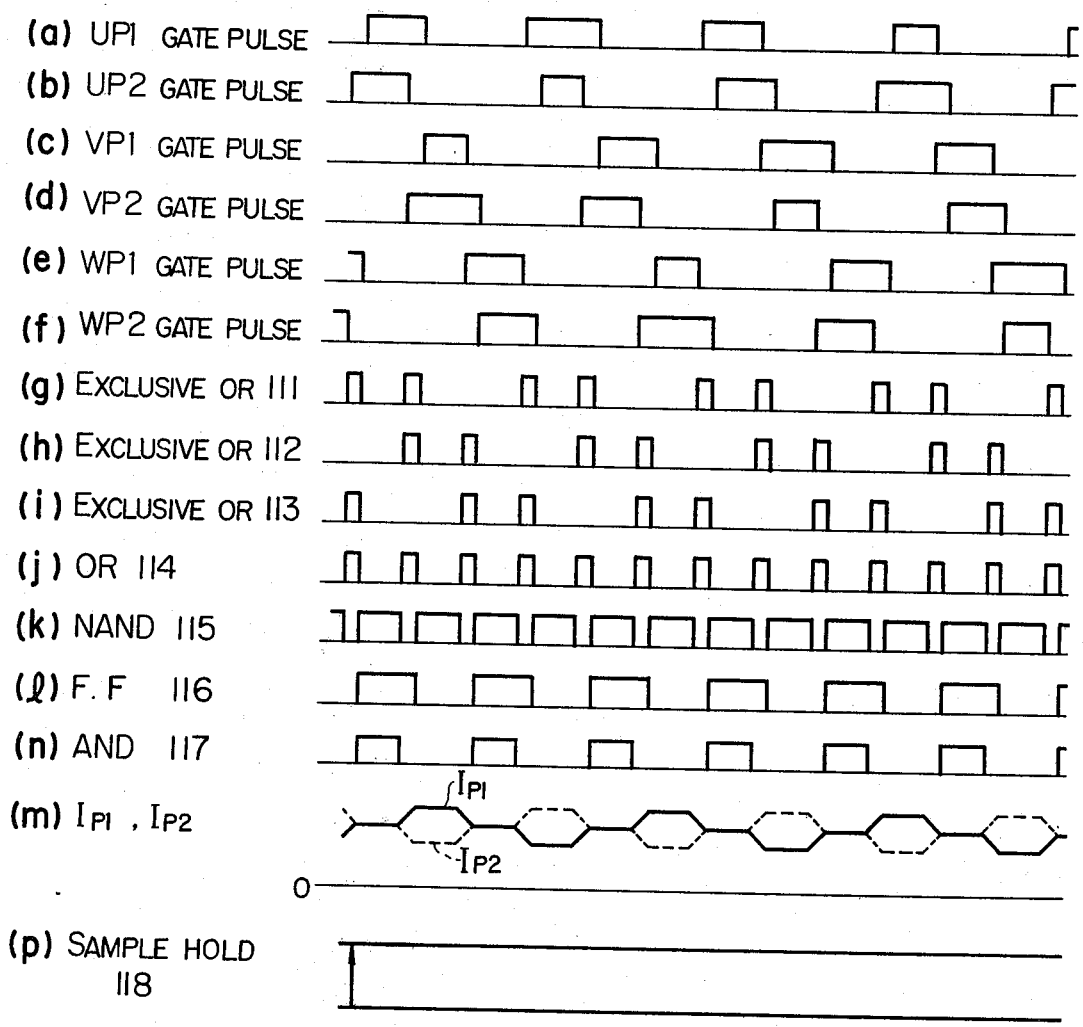
FIG. 7 is a time chart useful in explaining the operation of the individual components of the circuit shown in FIG. 6.

FIG. 6 shows one form of a circuit for detecting the direct current through the first inverter INV1 or the second inverter INV2. FIG. 7 is a time chart useful for explaining the operation of the circuit shown in FIG. 6. In FIG. 6, numerals 111 to 113 designate exclusive OR circuits, and the same gate pulses as those applied to the control gates of the respective main valves are applied to the input terminals of the exclusive OR circuits as shown in the Figure. Numeral 114 designates an OR circuit which is operable in response to the outputs of the exclusive OR circuits 111 to 113. Numeral 115 designates a NOT circuit for performing the NOT operation on the output of the OR circuit 114. Numeral 116 designates a flip-flop circuit responsive to the output of the NOT circuit 115 so as to be sequentially turned on and off repeatedly. Numeral 117 designates an AND circuit for performing the AND operation on the outputs of the NOT circuit 115 and the flip-flop circuit 116. Numeral 17 (or 18, 19, 20) designates a current transformer which is connected in a line 201 interconnecting a first inductor 13 and the first inverter INV1, a line 200 interconnecting a first inductor 12 and the second inverter INV2, a line 202 interconnecting a second inductor 14 and the first inverter INV1 or a line 203 interconnecting a second inductor 115 and the second inverter INV2. Numeral 118 designates a sample-and-hold circuit responsive to the output of the AND circuit 117 for sampling and holding the value of the output current of the current transformer 17 (or 18, 19, 20) during the time interval that the values of the currents $I_{P1}$ and $I_{P2}$ should be equal to each other. Numeral 119 designates a comparator for generating a fault detection signal 201 when the output of the sample-and-hold circuit 118 exceeds a predetermined value $S_c$. Symbols (a) to (f) designate the gate pulses for the main valves UP1 to WP2. Designated at (g) to (j) are signals whereby periods are detected in which different phases of the first and second inverters INV1 and INV2 are energized. The flip-flop circuit 116 comes into operation in response to an inverted signal (k) of the signal (j) and the AND of the signals (k) and (l) produces a signal (n), indicative of a period in which the equality is established between the direct currents flowing to the first and second inverters INV1 and INV2. The signal (m) is sampled and held according to the signal (n) thereby to generates an output signal indicated at (p). The comparator 119 generates an output signal when the output signal of the sample-and-hold circuit 118 shown in FIG. 7(p) becomes higher than the predetermined value $S_c$.

Figure 8:
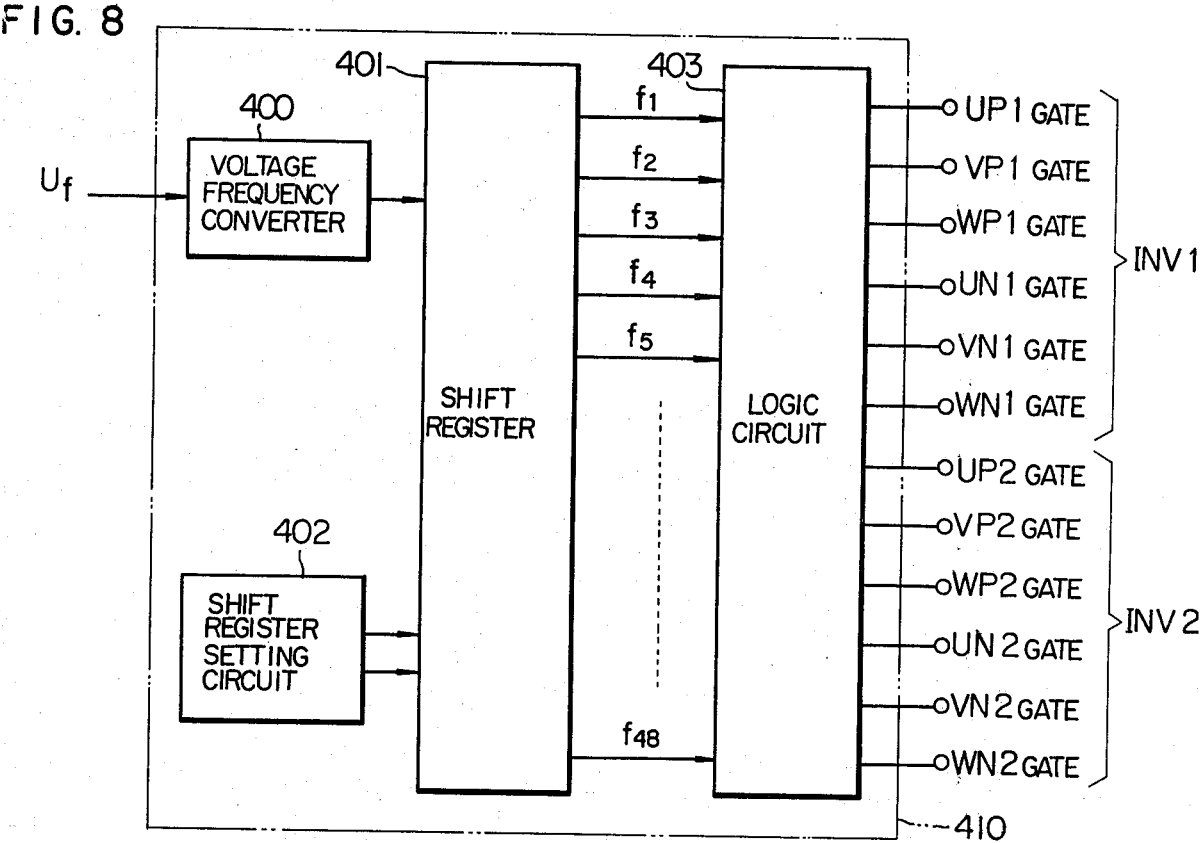
FIG. 8 is a block circuit diagram of a control unit for generating the gate pulse train shown in FIG. 4.

FIG. 8 shows a block circuit diagram of a control unit 410. A frequency control voltage $U_f$ is fed to a voltage-frequency converter 400 which delivers two mutually inverse rectangular output signals. The frequencies of these output signals are equal to 48 times the fundamental frequency of the resultant output voltages and adjustable, as is the phase of the signals, by changing the frequency control voltage $U_f$.

The output signals of the voltage-frequency converter 400 are fed to a shift register 401. At the latter, 48 switching pulses $f_1$ to $f_{48}$ are formed successively. These pulses are fed via 48 separate lines to a logic circuit 403. The individual switching pulses $f_1$ to $f_{48}$ are successively generated such that they are always mutually displaced by an electric angle of 30° for one cycle of the output signals of the voltage-frequency converter 400. Moreover, they are formed such that each is of 30° electrical length.

In addition to being fed by the output signals of the voltage-frequency converter 400, the shift register 401 also receives the output of a setting circuit 402, by means of which the shift register 401 can start, if stopped, its operation at a predetermined initial, condition, for example, at a condition to produce the signal of $f_1$.

The logic circuit 403 comprises a number of AND and OR logic elements which operate on the input switching pulses $f_1$ to $f_{48}$ to develop firing signals UP1 GATE to WN1 GATE for the first inverter INV1 as well as UP2 GATE to WN2 GATE for the second inverter INV2. The design of the logic circuit 403 may be conventional and as desired, as long as it is able, through logic interlinking, to furnish the firing signals.

The reason for limiting the switching pulses delivered from the shift register 401 to the 48 pulses $f_1$ to $f_{48}$ will now be described.

As will be seen by reference to FIG. 4(c), assuming that the number of intervals between the times $t_1$ and $t_2$ is 1, the period $t_1$ to $t_5$ corresponds to the control pulse for the main valve UP1 and the number of intervals is 4. For the next period $t_5$ to $t_8$ corresponding to the control pulse for the main valve VP1 the number of intervals is 3. The number of intervals in the period $t_8$ to $t_{12}$ for the main valve WP1 is 4, and the number of intervals in the period $t_{12}$ to $t_{17}$ for the main valve UP1 is 5. As a result, the control gate pulse train shown in FIG. 4 is made up of four consecutive pulse groups respectively involving 4, 3, 4 and 5 pulse intervals and there are three different values of pulse intervals of 3, 4 and 5. The pulse train of four pulses having 4, 3, 4 and 5 pulse intervals in that order, respectively, are repeatedly and successively applied to the main valves UP1, VP1 and WP1, respectively, in that order. Therefore, the first pulse having 4 pulse intervals of the pulse train is again applied to the main valve UP1 after the application of the pulse train is repeated three times. This occurs at a time $t_{49}$. As a result, the number of pulses delivered from the shift register 401 must be $(4+3+4+5) \times 3 = 48$.

Next, the waveforms of the control gate pulses UP1, VP1 and WP1 formed by the logic circuit 403 will be described with the aid of the Boolean expressions. In the discussion to follow, designated by $f_1$ is the pulse interval between the times $t_0$ and $t_1$, $f_2$ the pulse interval between the times $t_1$ and $t_2$ and so on. Also represented by $G_{UP1}$ is a Boolean expression for the control gate pulse applied to the main valve UP1 from the logic circuit 403.

$$G_{UP1} = (f_1 \vee f_2 \vee f_3 \vee f_4) \vee (f_{12} \vee f_{13} \vee f_{14} \vee f_{15} \vee f_{16}) \vee (f_{24} \vee f_{25} \vee f_{26} \vee f_{27}) \vee (f_{37} \vee f_{38} \vee f_{39})$$

The control gate pulse $G_{VP1}$ for the main valve VP1 is given by $$G_{VP1} = (f_5 \vee f_6 \vee f_7) \vee (f_{17} \vee f_{18} \vee f_{19} \vee f_{20}) \vee (f_{28} \vee f_{29} \vee f_{30} \vee f_{31}) \vee (f_{40} \vee f_{41} \vee f_{42} \vee f_{43})$$

The control gate pulse $G_{WP1}$ for the main valve WP1 is given by $$G_{WP1} = (f_8 \vee f_9 \vee f_{10} \vee f_{11}) \vee (f_{21} \vee f_{22} \vee f_{23}) \vee (f_{33} \vee f_{34} \vee f_{35}) \vee (f_{43} \vee f_{44} \vee f_{45} \vee f_{46})$$

Of course, the other control gate pulses $G_{UP2}$, $G_{VP2}$, $G_{WP2}$, $G_{UN1}$, $G_{VN1}$, $G_{WN1}$, $G_{UN2}$, $G_{VN2}$ and $G_{WN2}$ can be given in the form of Boolean expressions in the similar manner.

The pulse trains shown in FIG. 5 are each made up of 8 consecutive pulse groups respectively having pulse intervals of 4, 3, 5, 3, 4, 5, 3 and 5, and there are three different pulse intervals of 3, 4 and 5. The pulse train of eight pulses having 4, 3, 5, 3, 4, 5, 3 and 5 pulse intervals in that order, respectively, are repeatedly and successively applied to the main valves UP1, VP1 and WP1, respectively, in that order. Therefore, the first pulse of the pulse train is again applied to the main valve UP1 after the application of eight pulses of the pulse train is repeated three times. As a result, to form the shift register 401 of FIG. 8 by using the control pulse trains shown in FIG. 5, it is necessary to feed to the logic circuit 403 a total of $(4+3+5+3+4+5+3+5)=96$ or 96 pulses of $f_1$ to $f_{96}$. Where the logic circuit 403 shown in FIG. 4 is operated by the control pulse train shown in FIG. 5, the control gate pulses $G_{UP1}$ to $G_{WN2}$ can of course be given in the form of Boolean expressions.

Figure 1:
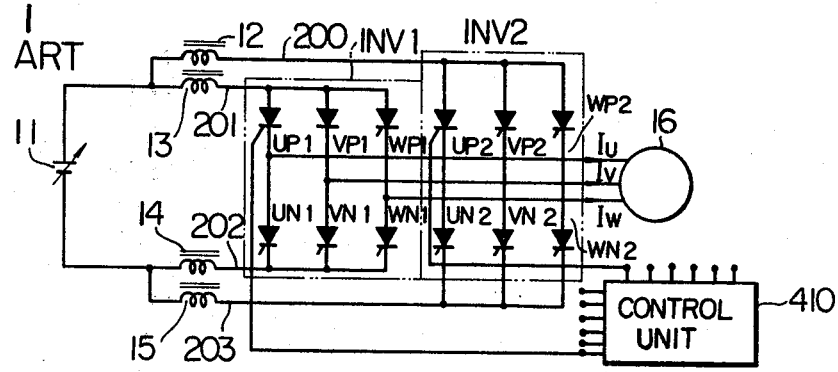
FIG. 1 is a diagram showing the arrangement of a twelve-step current source inverter embodying the present invention.
Figure 9:
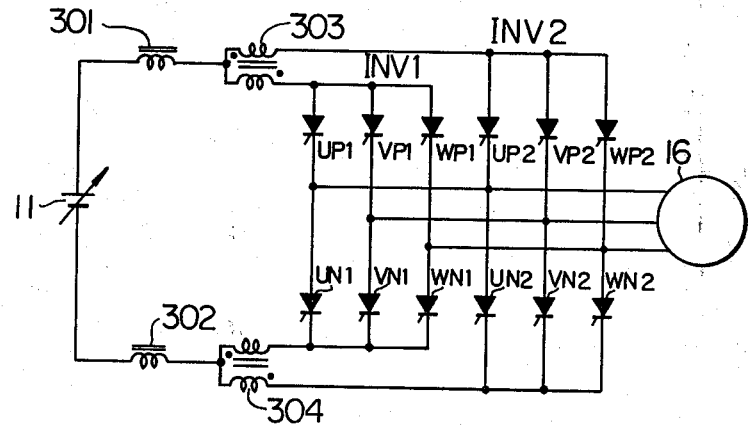
FIG. 9 is a diagram showing the arrangement of a twelve-step current source inverter according to another embodiment of the invention.

FIG. 9 is a circuit diagram showing another embodiment of the twelve-step current source inverter according to the invention. In the Figure, first and second inverters INV1 and INV2 are connected to a DC source 11 through DC reactors 301 and 302 and interphase reactors 303 and 304. In the Figure, the same reference numerals as used in FIG. 1 designate the same or equivalent components. In this embodiment the interphase reactors 12 and 13 of FIG. 1 are replaced with the separate DC reactor 301 and interphase reactor 303 and the DC reactors 14 and 15 are replaced with the separate DC reactor 302 and interphase reactor 304. The windings of the interphase reactors 303 and 304 are wound as shown to provide magnetic coupling. With the thusly connected inverters, the ripple occurring between the DC source 11 comprising a converter and the inverters are smoothed by the DC reactors 301 and 302 and the ripple due to the multiple-step inversion is smoothed by the interphase reactors 303 and 304. Since the interphase reactors 303 and 304 are wound as shown in the Figure to provide magnetic coupling and their windings are magnetically coupled, the resulting inductance value is 4 times the inductance value obtained with a single winding, and moreover the fact that the applied voltage is an AC voltage has the effect of permitting their manufacture as AC reactors with the resulting considerable reduction in the size of the device.

The embodiment shown in FIG. 9 has the advantage of reducing the size of the direct current smoothing reactors, and it is also advantageous in that due to the fact that the inductance value of the interphase reactors is increased by four times, the i'-to-j' and k'-to-l' portions shown in FIG. 4 can be made sufficiently flat with the resulting improvement on the output waveform.

Figure 10:
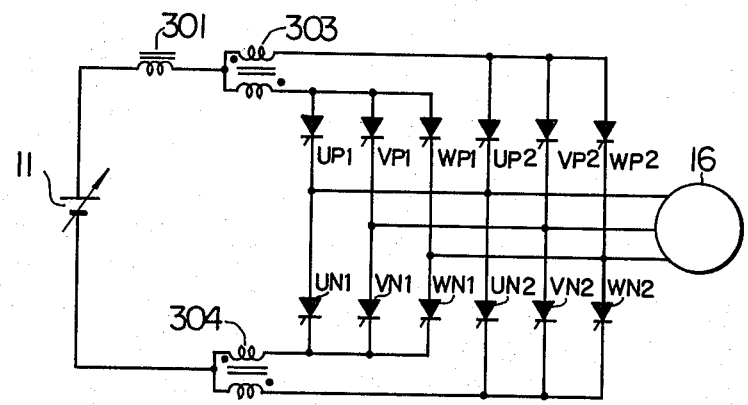
FIG. 10 is a diagram showing the arrangement of a twelve-step current source inverter according to still another embodiment of the invention.

FIG. 10 shows still another embodiment of the invention, which differs from the embodiment of FIG. 9 in that only the single DC reactor 301 is used in place of the DC reactors 301 and 302. This embodiment is advantageous in that the size of the device is further reduced due to the use of the single DC reactor.

We claim:

1. In a twelve-step current source inverter comprising:
   (1) a first current balancing inductor for smoothing a direct current flowing thereto from a DC source;
   (2) a second current balancing inductor for smoothing a direct current flowing thereto from said DC source, said second current balancing inductor having an inductance equal to that of said first current balancing inductor;
   (3) a first inverter including first 1st-phase, 2nd-phase and 3rd-phase main valves which are on a positive terminal side and second 1st-phase, 2nd-phase and 3rd-phase main valves which are on a negative terminal side to form a first three-phase bridge, said first and second main valves being connected to said first current balancing inductor;
   (4) a second inverter including first 1st-phase, 2nd-phase and 3rd-phase main valves which are on said positive terminal side and second 1st-phase, 2nd-phase and 3rd-phase main valves which are on said negative terminal side to form a second three-phase bridge, said main valves of said second inverter being connected to said second current balancing inductor, said second inverter having an apparent power equal to that of said first inverter;
   (5) combining means for combining said first and second inverters of currents to derive a three-phase system of resultant output currents; and
   (6) a control unit for applying to control gates of said positive-side and negative-side first and second main valves of said first and second inverters pulses which select the firing order thereof in the order of said 1st-phase, 2nd-phase and 3rd-phase and determine the firing intervals thereof, whereby said combining means generate stepped-waveform resultant output currents,
   the improvement wherein said pulses sequentially applied to said control gates from said control unit are in the form of a pulse train made up of groups of pulses involving three kinds of intervals which are different in value from one another, and wherein said pulse train is made periodic, whereby each of said main valves is repeatedly fired by selected ones of said pulses having the same intervals.

2. In a twelve-step current source inverter comprising:
   (1) first current balancing inductors comprising a first inductor and a second inductor, one end of said first inductor being connected to a positive terminal of a DC source, one end of said second inductor being connected to a negative terminal of said DC source;
   (2) second current balancing inductors comprising a first inductor and a second inductor having one ends thereof respectively connected to the positive and negative terminals of said DC source, each of the first and second inductors of said first and second current balancing inductors having the same value;
   (3) a first inverter comprising three first main valves each thereof being connected to the other end of the first inductor of said first current balancing inductors, having a control gate and arranged on said positive terminal side and three second main valves each thereof being connected to the other end of the second inductor of said first current balancing inductors, having a control gate and arranged on said negative terminal side to form a first three-phase bridge, said first inverter further comprising first commutating devices for quenching said first and second main valves, said first inverter providing a first three-phase system of inverter output currents;
   (4) a second inverter having an apparent power of the same value as that of said first inverter and comprising three main valves each thereof being connected to the other end of the first inductor of said second current balancing inductors, having a control gate and arranged on said positive terminal and three second main valves each thereof being connected to the other end of the second inductor of said second current balancing inductors, having a control gate and arranged on said negative terminal side to form a second three-phase bridge, said second inverter further comprising second commutating devices for quenching said first and second main valves thereof, said second inverter providing a second three-phase system of inverter output currents;
   (5) combining means for combining said first and second systems of currents to derive a three-phase system of resultant output currents; and
   (6) a control unit for applying to the control gates of said main valves of said first and second inverters pulses which determine a firing order and firing intervals of said main valves,
   the improvement wherein said control unit generates said gate pulses arranged in such a manner that where the same one of said phases in each of said first and second inverters is being energized and the transfer of conduction to another one of said phases is to be effected, commutation in each of said first and second inverters in preference to the other is made periodic, that the number of times of said preferential commutation in said first inverter is made equal to that of said second inverter in each cycle period of said gate pulses and that said preferential commutation is effected two times in succession in one or the other of said first and second inverters at least once in said each cycle period, whereby said combining means generates stepped-waveform output currents.

3. A twelve-step current source inverter as set forth in claim 2, wherein said preferential commutation is alternately effected twice at a time in said first and second inverters.

4. A twelve-step current source inverter as set forth in claim 3, wherein at least one smoothing DC reactor is connected between said first or second current balancing inductors and said DC source, wherein said first inductors of said first and second current balancing inductors form a first interphase reactor which couples said first inductors magnetically to reduce a ripple produced between the positive side of said first inverter and the positive side of said second inverter, and wherein said second inductors of said first and second current balancing inductors form a second interphase reactor which couples said second inductors magnetically to reduce a ripple produced between the negative side of said first inverter and the negative side of said second inverter.

5. A twelve-step current source inverter as set forth in claim 2 wherein at least one smoothing DC reactor is connected between said first or second current balancing inductors and said DC source, wherein said first inductors of said first and second current balancing inductors form a first interphase reactor which couples said first inductors magnetically to reduce a ripple produced between the positive side of said first inverter and the positive side of said second inverter, and wherein said second inductors of said first and second current balancing inductors form a second interphase reactor which couples said second inductors magnetically to reduce a ripple produced between the negative side of said first inverter and the negative side of said second inverter.

6. A twelve-step current source inverter as set forth in claim 1, 2, 3, 5 or 4 further comprising a fault detecting circuit, said fault detecting circuit comprising:
(1) three exclusive OR circuits each receiving the gate pulses applied to the control gates of associated ones of said main valves of said first and second inverters having the same phase and polarity;
(2) an OR circuit for performing an OR operation on outputs of said exclusive OR circuits;
(3) a NOT circuit for performing a NOT operation on an output of said OR circuit;
(4) a flip-flop circuit responsive to outputs of said NOT circuit so as to be turned on and off successively;
(5) an AND circuit for performing an AND operation on outputs of said NOT circuit and said flip-flop circuit;
(6) at least one current transformer for detecting the value of a current flowing between one of said first and second inductors and said first or second inverter;
(7) a sample-and-hold circuit responsive to an output of said AND circuit to sample and hold an output current of said current transformer; and
(8) a comparator for comapring an output of said sample and hold circuit with a constant value to determined whether the same is greater than said constant value.

* * * * *